United States Patent [19]

Kolt

[11] Patent Number: 4,507,922
[45] Date of Patent: Apr. 2, 1985

[54] THERMOSTATIC ASSEMBLY

[75] Inventor: Stanley Kolt, Mamaroneck, N.Y.

[73] Assignee: Leonard W. Suroff, Jericho, N.Y.; a part interest

[21] Appl. No.: 325,659

[22] Filed: Nov. 30, 1981

[51] Int. Cl.³ ................................................ F01G 7/06
[52] U.S. Cl. ........................................................ 60/531; 236/99 R; 236/100; 92/34, 92/43, 92/99
[58] Field of Search ............... 60/527, 530, 531; 236/99 R, 99 K, 100, 101 R; 374/201, 203; 92/34, 43, 45, 98 R, 99

[56] References Cited

U.S. PATENT DOCUMENTS

| 731,959 | 6/1903 | Sheer | 60/530 |
|---|---|---|---|
| 1,449,998 | 3/1923 | Hunter | 236/99 R |
| 1,819,987 | 8/1931 | Hodge | 236/44 R |
| 2,726,041 | 12/1955 | Winet | 236/99 R |
| 2,938,384 | 5/1960 | Soreng et al. | 60/527 |
| 3,153,933 | 10/1964 | Freismuth | 60/527 |
| 3,702,589 | 11/1972 | Ebert | 60/529 XR |

FOREIGN PATENT DOCUMENTS 2255486  7/1975  France ................................ 60/527

Primary Examiner—Allen M. Ostrager
Attorney, Agent, or Firm—Leonard W. Suroff

[57] ABSTRACT

An assembly having a heat expansible fluid therein and capable of expanding and contracting in response to temperature changes between predetermined limits with a first member having a front surface and a rear surface, with the surfaces terminating in a free end. A second member having a rear front surface and a rear surface is also provided with the surfaces terminating in a free end. The first member may include an inner section, with an outer section, and a central section extending intermediate the inner and outer section. The central section has a curved wall extending outwardly from the rear surface. The inner section is adapted to expand outwardly upon the assembly being elevated in temperature which results in the expansion of the heat expansible fluid contained therein. The assembly can be designed to be fully expanded at approximately 85° F. and contracted at approximately 65° F. in an unloaded condition. The expansion temperature range is directly related to the application for which the assembly is utilized.

28 Claims, 7 Drawing Figures

THERMOSTATIC ASSEMBLY

BACKGROUND OF THE INVENTION

The present invention is directed generally to a thermostatic assembly or gaseous thermostat. The assembly is utilized in those applications in which a force is to be transmitted when the assembly becomes elevated to a predetermined temperature range.

The field of use for a thermostatic assembly has continued to grow since electrical energy to activate or operate same is not required. Unfortunately prior art units have been limited in their ability to generally withstand applications which could exceed 200° F.

The assembly of the present invention is fabricated, dimensioned and designed to withstand and operate in a wide temperature range and therefor provide utilization in various applications.

OBJECTS OF THE INVENTION

An object of the present invention is to provide a thermostatic assembly that expands and contracts in response to temperature changes between predetermined temperature limits.

Another object of the present invention is to provide an assembly capable of withstanding temperature ranges of up to 200° F. without damage.

Another object of the present invention is to provide an assembly that has application for use in various forms of passive energy saving devices and other systems using same.

Another object of the present invention is to provide a process for the manufacture of the thermostatic assembly of the present invention.

Other objects and advantages of the present invention will become apparent as the disclosure proceeds.

SUMMARY OF THE INVENTION

The present invention relates to an assembly having a heat expansible fluid therein and capable of expanding and contracting in response to temperature changes between predetermined limits. The assembly comprises a first member having a front surface and a rear surface, with the surfaces terminating in a free end. A second member having a rear front surface and a rear surface is also provided with the surfaces terminating in a free end. The members are positioned in overlapping positionment with each other.

The first member may include an inner section, with an outer section, and a central section extending intermediate the inner and outer section. The central section has a curved wall extending outwardly from the rear surface. The inner section is adapted to expand outwardly upon the assembly being elevated in temperature which results in the expansion of the heat expansible fluid contained therein. The assembly can be designed to be fully expanded at approximately 85° F. and contracted at approximately 65° F. in an unloaded condition. The expansion temperature range is directly related to the application for which the assembly is utilized.

One application of the assembly for example may be as illustrated in U.S. Pat. No. 4,123,001. The force transmitted by the assembly in its loaded condition will vary and thus change the temperature at which the assembly reaches its fully open or expanded position and its closed or collapsed condition.

Sealing means is provided to obtain a fluid tight connection of the members at the free ends thereof so as to permit the expansion of the fluid therein such that the first member expands to generate a force in response to temperature changes of the assembly. Depending upon the construction the second member may concurrently expand also.

The sealing means may include a ring circumferentially extending around the free ends of the members and in partially overlapping relationship to the outer surface of each one of the members. The ring may be fabricated from a metallic material such as soft brass. In addition a sealent, such as lead, extends intermediate the ring and the members so as to obtain the fluid tight seal therebetween. The sealent extends intermediate the rear surface of each one of the members. To obtain the desired strength of the assembly the first member and the second member are each preferably fabricated from a metallic material, such as spring brass. In addition the free end has a circular configuration.

There is also provided coupling means to provide a manner of securing an element to the assembly. The coupling means includes a head for connection to the element. The head may have a threaded aperture to receive a threaded element therein. In accordance with another embodiment the assembly can be constructed with the rear surface and front surface of the second member being substantially flat and non-expandable.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
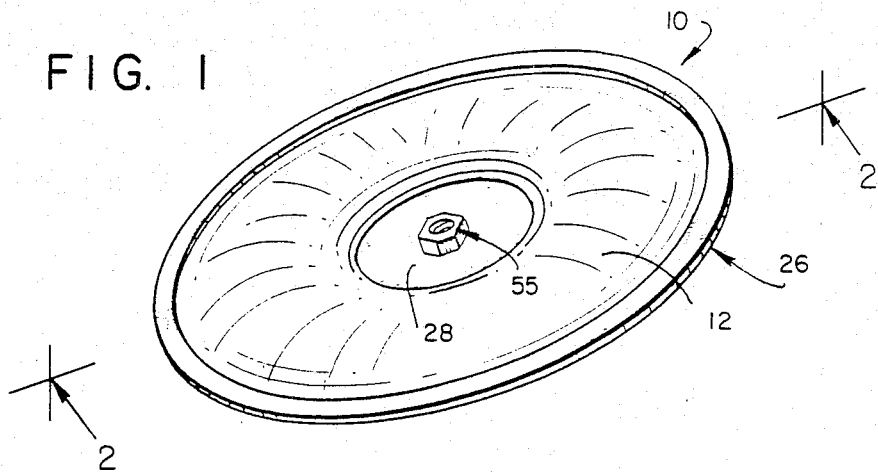
FIG. 1 is a perspective view of the assembly in accordance with the present invention.
Figure 2:
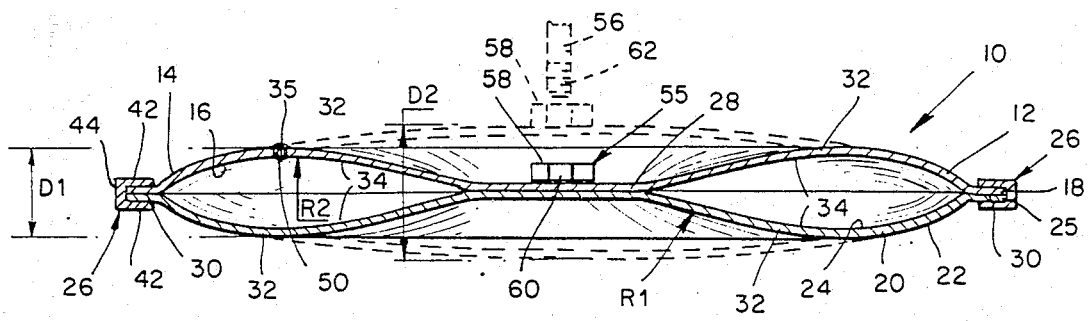
FIG. 2 is a sectional view taken along line 2—2 of FIG. 1.

Referring to the drawings there is illustrated in FIGS. 1 and 2 an assembly 10 having a heat expansible fluid therein that is capable of expanding and contracting in response to temperature changes between predetermined limits. The assembly 10 comprises a first member 12 having a front surface 14 and a rear surface 16 with the surfaces terminating in a free end 18. A second member 20 having a front surface 22 and a rear surface 24 is also provided with the surfaces terminating in a free end 25. The members 12 and 20 are positioned in overlapping positionment with each other and retained in fluid tight relationship by sealing means 26.

The first member 12 and second member 20 each include an inner section 28 with an outer section 30, and a central section 32 extending intermediate the inner section 28 and outer section 30. Each one of the sections 32 has a curved wall 34 extending outwardly from the rear surfaces 16 and 24. The inner section 28 is adapted to expand outwardly upon the assembly 10 being elevated in temperature which results in the expansion of the heat expansible fluid contained therein. The assembly 10 can be designed to be fully expanded at approximately 80° F. or in the range of 75° F. to 80° F., and contracted at approximately 65° F. in an unloaded condition. The expansion temperature range is directly related to the application for which the assembly is utilized and the amount or volume of the expansible fluid, such as ether, that is contained therein. The dimensions of the assembly 10 is that the curved wall 34 is formed of a radius R1 which may be 2.5 inches approximately and a radius R2 of 0.625 inches, blended together. Dimension D1 being 0.187 inches and D2 being 0.420 inches as illustrated in FIG. 2. The inner section would have a diameter of 0.687 inches. Obviously the dimensions may vary.

Accordingly as illustrated in FIG. 2 the assembly 10 in its closed position will expand such that when fully extended the members 12 and 20 take the position as illustrated in phantom. The rear surfaces 16 and 24 of the inner section 28, and the outer section 30, extend in a common plane in the contracted position of the assembly. In the expanded position the rear surfaces 16 and 24 of the central sections 32 extend in a continuous plane that is curved or bowed with the inner sections 28. The mounting of the assembly 10 may take various forms known in the art.

The force transmitted by the assembly 10 in its loaded condition will vary and thus change the temperature at which the assembly 10 reaches its fully open or expanded position. The contraction of the assembly 10 will occur until its closed or collapsed condition is reached. To obtain the desired strength of the assembly 10 the first member 12 and the second member 20 are each preferably fabricated from a metallic material, such as spring brass for example 0.006 inches. The free ends 18 and 25 each preferably have a circular configuration of the same dimension. An assembly may have an outer dimension of about 3 inches, but this may be varied per application and be larger or smaller.

The sealing means 26 is provided to obtain a fluid tight connection joining between the members 12 and 20 at the free ends 18 and 25, respectively so as to permit the expansion of the fluid therein such that the first member expands to generate a force in response to temperature changes of the assembly 10. Depending upon the construction the second member 20 may concurrently expand also.

The sealing means 26 may be comprised of a sealent 35, such as zinc and lead combined, that extends intermediate the members 12 and 20 so as to obtain the fluid tight seal between the rear surfaces 16 and 24. The sealent 35 extends intermediate the rear surfaces 16 and 24 of each one of the members 12 and 20 extending at least inwardly from the free ends 18 and 25.

Figure 5:
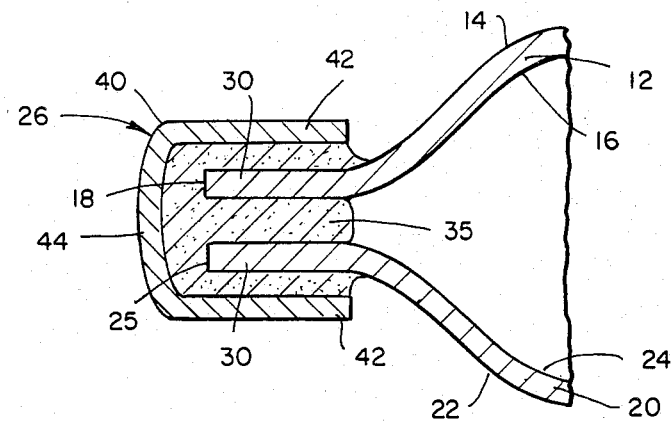
FIG. 5 is a further enlarged fragmentary view similar to FIG. 4 illustrating one end of the assembly and the manner of sealing thereof.

The sealing means 26 may further include a ring 40 circumferentially extending around the free ends 18 and 25 of the members 40 and in partially overlapping relationship to the front surfaces 14 and 22 of each one of the members 12 and 20. The ring 40 may be fabricated from a metallic material such as soft brass. If the ring 40 is utilized then the sealent 35 may extend beyond the free ends 18 and 25 as illustrated in FIG. 5 and a portion 36 of the sealent 35 may extend intermediate the lips 42 of the ring 40 and the front surfaces 14 and 22. The lips 42 extend from the base 44 of the ring 40.

Figure 3:
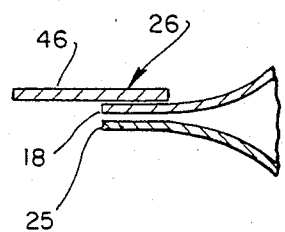
FIG. 3 is an enlarged view illustrating the manner of fabricating the assembly of the present invention.
Figure 4:
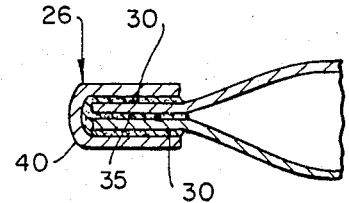
FIG. 4 is an enlarged fragmentary view of one end of the assembly illustrating the construction thereof.

The ring 40 may be formed on the assembly 10 and may commence as a disc 46 as illustrated in FIG. 3. The forming of the ring 40 occurs circumferentially around the free ends 18 and 25 with the sealent 35 contained in position and in the formed position the lips 42 extend in partially overlapping relationship to the front surfaces 14 and 22. By providing the sealent 35 the fluid tight seal is obtained.

The assembly 10 may have an aperture 50 on one of the members 12 and 20. The aperture 50 is used for filing the assembly 10 with the heat expansible fluid and thereafter closing the aperture 50 by a lump of sealent 35 to prevent leakage of the expansible fluid.

There is also provided coupling means 55 to provide a manner of securing an element 56 to the assembly 10. The coupling means 55 includes a head 58 for connection to the element 56. The head 58 may have a threaded aperture 60 to receive a threaded element 62 therein.

Figure 6:
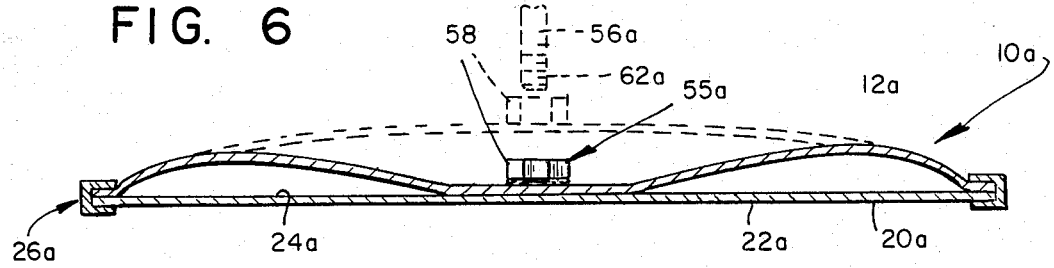
FIG. 6 is a sectional view similar to FIG. 2 illustrating an alternate embodiment of the invention.

In accordance with another embodiment of the invention illustrated in FIG. 6, the assembly 10a can be constructed with the rear surface 24a and front surface 22a of the second member 20a being substantially flat and non-expandable.

Figure 7:
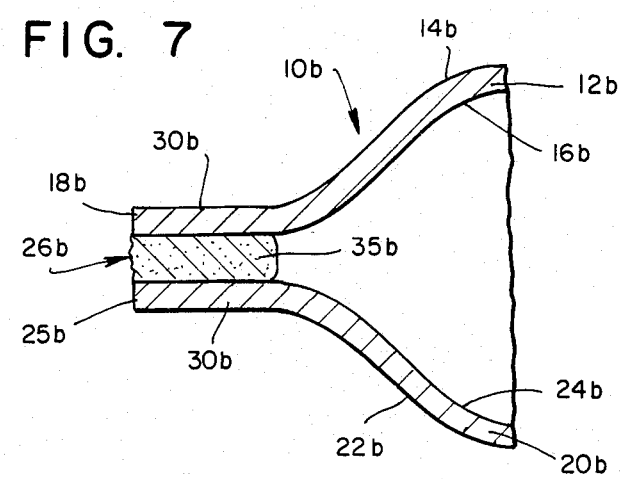
FIG. 7 is an enlarged fragmentary view illustrating the sealing means in accordance with another embodiment of the invention.

In accordance with another embodiment of the invention illustrated in FIG. 7, the assembly 10b can be constructed with the sealing means 26b having a sealant 35b that terminates substantially at the free ends 18b and 25b. The configuration of the assembly 10b may be as in FIGS. 1-5 or 6.

Although illustrative embodiments of the invention have been described in detail herein with reference to the accompanying drawings, it is to be understood that the invention is not limited to the precise embodiments and that various changes and modifications may be effected therein without departing from the scope or spirit of the invention.

I claim:

1. An assembly having a heat expansible fluid therein and capable of expanding and contracting in response to temperature changes between predetermined limits, said assembly comprising:
   A. a first member having a front surface and a rear surface with said surfaces terminating in a free end,
   B. a second member having a front surface and a rear surface with said surfaces terminating in a free end,
   C. sealing means to provide a fluid tight connection of said members at said free ends thereof so as to permit the expansion of the fluid therein such that said first member expands to generate a force in response to temperature changes of the assembly, and
   D. said sealing means including
      (1) a ring circumferentially extending around said free ends of said members and in partially overlapping relationship to said outer surface of each one of said members, and
      (2) a sealent extending intermediate said ring and said members so as to maintain the fluid tight seal therebetween.

2. The assembly as defined in claim 1, wherein said first member and said second member are each fabricated from a metallic material.

3. The assembly as defined in claim 1, wherein said free end of each of said members has a circular configuration.

4. The assembly as defined in claim 1, wherein said front surface and said rear surface of said second member are substantially flat.

5. The assembly as defined in claim 1, further including coupling means to provide a manner of securing an element to the assembly.

6. The assembly as defined in claim 5, wherein said coupling means includes a head for connection to the element.

7. The assembly as defined in claim 6, wherein said head has a threaded aperture to receive the element therein.

8. The assembly as defined in claim 1, wherein said sealent extends intermediate said inner surface of each one of said members.

9. The assembly as defined in claim 1, wherein said first member includes:
   (a) an inner section,
   (b) an outer section, and
   (c) a central section extending intermediate said other sections and having a curved wall extending outwardly from said inner surface, said inner section adapted to expand outwardly upon the expansion of the fluid within the assembly.

10. The assembly as defined in claim 1, wherein the assembly can be fully expanded at about 75° F.

11. The assembly as defined in claim 1, wherein the assembly is fully contracted at about 65° F.

12. The assembly as defined in claim 1, wherein said second member expands concurrently with said first member.

13. An assembly having a heat expansible fluid therein and capable of expanding and contracting in response to temperature changes between predetermined limits, said assembly comprising:
   A. a first member having a front surface and a rear surface with said surfaces terminating in a free end,
   B. a second member having a front surface and a rear surface with said surfaces terminating in a free end,
   C. sealing means to provide a fluid tight connection of said members of said inner surfaces at said free ends thereof so as to permit the expansion of the fluid therein, such that said first member expands to generate a force in response to temperature changes of the assembly, and
   D. said first member includes:
      (a) an inner section,
      (b) an outer section terminating in said free end, and
      (c) a central section extending intermediate said other sections and having an outwardly extending curved wall, said inner section adapted to expand outwardly upon the expansion of the fluid within the assembly.

14. The assembly as defined in claim 1, wherein said free end of each of said members has a circular configuration.

15. The assembly as defined in claim 13, wherein said front surface and said rear surface of said second member are substantially flat.

16. The assembly as defined in claim 13, further including coupling means to provide a manner of securing an element to the assembly.

17. The assembly as defined in claim 16, wherein said coupling means includes a head for connection to the element.

18. The assembly as defined in claim 17, wherein said head has a threaded aperture to receive the element therein.

19. The assembly as defined in claim 13, wherein said sealent extends intermediate said inner surface of each one of said members adjacent to said free end thereof.

20. The assembly as defined in claim 13, wherein the assembly can be fully expanded at about 85° F.

21. The assembly as defined in claim 13, wherein the assembly is fully contracted at about 65° F.

22. The assembly as defined in claim 13, wherein said rear surface of said inner section and said outer section extend in a common plane in the contracted position of the assembly and in the expanded position said rear surface of said central section and said inner section extend in a continuous plane.

23. The assembly as defined in claim 13, wherein said second member expands concurrently with said first member.

24. The method of producing an assembly having a heat expansible fluid therein and capable of expanding and contracting in response to temperature changes between predetermined limits, comprising the steps of:
   A. positioning a first member and a second member in overlapping arrangement to each other, said members each having a rear surface and a front surface with said surfaces terminating in a free end,
   B. sealing said members together along each of said free ends to provide a fluid tight connection of said members so as to permit the expansion of the fluid therein such that said first member expands to generate a force in response to temperature changes of the assembly, and
   C. said sealing includes
      (1) forming a ring circumferentially around said free ends of said members and in partially overlapping relationship to said front surface of each one of said members, and
      (2) providing a sealent extending intermediate said ring and said members so as to obtain the fluid tight seal therebetween.

25. The method as defined in claim 24, further including the step of filling the assembly with the heat expansible fluid.

26. The assembly as defined in claim 25, further including the step of closing the assembly to prevent leakage of the expansible fluid.

27. The method as defined in claim 25, wherein said expansible fluid is ether.

28. The assembly as defined in claim 25, wherein said sealent extends intermediate said inner surface of each one of said members.

* * * * *

UNITED STATES PATENT AND TRADEMARK OFFICE
CERTIFICATE OF CORRECTION

PATENT NO. : 4,507,922

DATED : April 2, 1985

INVENTOR(S) : Stanley Kolt

It is certified that error appears in the above-identified patent and that said Letters Patent is hereby corrected as shown below:

In the Abstract of the Disclosure

Delete the Abstract in its entirety and insert therefor the following:

ABSTRACT

An assembly having a heat expansible fluid therein and capable of expanding and contracting in response to temperature changes between predetermined limits with a first member having a front surface and a rear surface, with each having relatively flat inner and outer sections and a curved central section, the outer section terminating in a free end. The central section extends outwardly and is intermediate the inner and outer sections. A second member has a front surface and a rear surface, with the surfaces terminating in a free end. The inner section is adapted to expand outwardly upon the assembly being elevated in temperature which results in the expansion of the heat expansible fluid contained therein. The assembly can be designed to be fully expanded at approximately 85 degrees F and contracted at approximately 65 degrees F in an unloaded condition. The expansion temperature range is directly related to the application for which the assembly is utilized.

UNITED STATES PATENT AND TRADEMARK OFFICE
CERTIFICATE OF CORRECTION

PATENT NO. : 4,507,922

DATED : April 2, 1985

INVENTOR(S) : Stanley Kolt

It is certified that error appears in the above-identified patent and that said Letters Patent is hereby corrected as shown below:

In the Specification

Delete the word "sealent" and insert therefor --sealant-- wherever it occurs.

Column 1; line 46, delete "rear";
 Line 53, delete "has" and insert therefor --is--.
 Line 59, after "65° F" insert --wherein the central portion is generally in intimate contact with the second member--.
 Column 3; line 7, delete "has a" and insert therefor --is--, and delete "wall 34" and insert therefor --(wall 34)--;
 Line 15, after "condition" insert --wherein the central section 32 is generally in intimate contact with the second member rear surface 24--.

In the Claims

Delete Claims 1, 3 through 13, 15, and 24 through 28.

Add Claims 29, 30 and 31 as follows:
 --29. An assembly having a heat expansible fluid therein and capable of expanding and contracting in response to temperature changes between predetermined limits, said assembly comprising:

UNITED STATES PATENT AND TRADEMARK OFFICE
CERTIFICATE OF CORRECTION

PATENT NO. : 4,507,922

DATED : April 2, 1985

INVENTOR(S) : Stanley Kolt

It is certified that error appears in the above-identified patent and that said Letters Patent is hereby corrected as shown below:

A. a first member having a front surface and a rear surface with said surfaces terminating in a free end, said first member including;
        i) an inner section,
        ii) an outer section terminating in said free end, and
        iii) a curved outwardly extending central section intermediate said inner section and said outer section, said inner section adapted to expand outwardly upon the expansion of the fluid within the assembly;
    B. a second member having a front surface and a rear surface with said surfaces terminating in a free end; and
    C. sealing means to provide a fluid tight connection of said members at the inner surfaces of said free ends so as to permit the expansion of the fluid therein, such that said first member expands to generate a force in response to temperature changes of the assembly; and
    said rear surface of said first member inner section being generally in intimate contact with said rear surface of said second member when said assembly is fully contracted.

30. An assembly as defined in Claim 29 wherein said sealing means includes a ring means circumferentially extending around said free ends of said members and in partially overlapping relationship to the outer surface of each one of said members.

31. The assembly as defined in Claim 30 wherein said sealing means further includes a sealant extending

UNITED STATES PATENT AND TRADEMARK OFFICE
CERTIFICATE OF CORRECTION

PATENT NO. : 4,507,922
DATED : April 2, 1985
INVENTOR(S) : Stanley Kolt

It is certified that error appears in the above-identified patent and that said Letters Patent is hereby corrected as shown below:

intermediate said ring and said members so as to maintain the fluid tight seal therebetween.--

Claims 2 and 14, line 1; delete the numeral "1" and insert therefor the numeral --29--.

Claims 16 and 19 through 23, line 1; delete the numeral "13" and insert therefor the numeral --29--.

On the title page "28 Claims" should read -- 13 Claims --.

Signed and Sealed this

Fourth Day of February 1986

[SEAL]

Attest:

DONALD J. QUIGG

Attesting Officer

Commissioner of Patents and Trademarks